United States Patent
Simpson et al.

(10) Patent No.: US 7,909,580 B2
(45) Date of Patent: Mar. 22, 2011

(54) VANES FOR EXPOSURE TO VIBRATORY LOADING

(75) Inventors: George Simpson, Derby (GB); Caetano Peng, Derby (GB); Gordon May, Derby (GB); Mehdi Vahdati, London (GB); Abdulnaser Sayma, Kenley (GB); Mehmet Imregun, London (GB)

(73) Assignee: Rolls-Royce plc, London (GB)

( * ) Notice: Subject to any disclaimer, the term of this patent is extended or adjusted under 35 U.S.C. 154(b) by 286 days.

(21) Appl. No.: 12/081,381

(22) Filed: Apr. 15, 2008

(65) Prior Publication Data

US 2009/0055146 A1    Feb. 26, 2009

Related U.S. Application Data

(63) Continuation of application No. 10/962,470, filed on Oct. 13, 2004, now abandoned.

(30) Foreign Application Priority Data

Oct. 29, 2003    (GB) .................................. 0325215.2

(51) Int. Cl.
    *F03B 3/12*    (2006.01)
(52) U.S. Cl. .................. 416/223 A; 416/61; 416/DIG. 2
(58) Field of Classification Search .............. 29/889.2, 29/889.22; 416/223 A, DIG. 2, 61
    See application file for complete search history.

(56) References Cited

U.S. PATENT DOCUMENTS 5,537,861 A * 7/1996 Seitelman et al. ................ 73/66

OTHER PUBLICATIONS

Sayma et al., Modelling of 3D viscous compressible flows using unstructured hybrid grids, AIAA Journal, 38(b), pp. 945-954, Jun. 2000.
Newland, D.E., Mechanical vibration analysis and computation, Longman Scientific and Technical/Wiley, 1989, ISBN 0-582-02744-b.

* cited by examiner

*Primary Examiner* — Igor Kershteyn
(74) *Attorney, Agent, or Firm* — Jeffrey S. Melcher; Manelli Denison & Selter PLLC

(57) ABSTRACT

Disclosed are methods for designing vanes that, in use, are expected to be exposed to vibratory loading, in particular rotor or stator vanes for aero engines or turbomachinery. A quantitative characteristic (modeshape) is used which is a measure of correlation between the excitation force to which the vane is to be subjected in use and a vibrational mode of the vane, corresponding to a characteristic frequency of the excitation. The modeshape of the first design is determined. Then the first design is modified to give a second design, by one or more of leaning, sweeping or twisting the blade design, or by altering the local shape of the design, or by altering the material of the design. Then the modeshape of the second design is determined. The design modification gives rise to a reduction in the forced response levels.

28 Claims, 5 Drawing Sheets

+0.25
+1
+0.5
+0.2
+0.1
0

−1
+1
+0.1
−0.8
0

Modal Force

Datum Blade 22

Final Blade 24

VANES FOR EXPOSURE TO VIBRATORY LOADING

TITLE OF THE INVENTION

CROSS-REFERENCE TO RELATED APPLICATIONS

This application is a continuation of U.S. application Ser. No. 10/962,470, filed Oct. 13, 2004, now abandoned, which claims priority to Great Britain patent application No. GB 0325215.2, filed Oct. 29, 2003.

BACKGROUND OF THE INVENTION

The present invention relates to methods and systems for designing components that, in use, are expected to encounter vibratory loading. In particular, the invention has applicability in the field of aero engines and turbomachinery.

A typical turbine engine (or typical turbomachinery) contains several annular fluid-conveying ducts which form, e.g., the compressor or turbine sections of the engine.

Each of these ducts contains a number of blades or vanes (which are henceforth called guide vanes or simply vanes) circumferentially distributed in one or more vane assemblies in the duct. The vanes are categorized as rotor blades or stator vanes depending on whether or not the respective vane rotates in the duct when the engine operates. Typically, each vane has a surface that extends radially across the duct.

When subjected to high speed airflows, vanes typically become susceptible to large amplitude vibration, often caused by unsteady aerodynamic forces. The unsteady aerodynamic forces are caused by the "wakes" of components upstream in the fluid-conveying duct. This is illustrated by the following example in which the vane of interest is a rotating compressor blade. Note that the vanes can also be subjected to forcing from the downstream pressure fields (e.g. from downstream vanes).

In this example, a set of stator blades are provided, situated upstream of the compressor blade. The function of the stator blades is to adjust the direction of fluid flow towards the compressor blades. Each stator blade has an associated wake. As the compressor blade rotates, it "sees" a wake from each stator blade in turn. The frequency f at which the compressor blade sees a stator wake is therefore equal to the number of complete revolutions of the compressor blade per second multiplied by the number of stator blades in the set of stator blades (assuming that the stator blades are circumferentially equispaced from each other).

The travel of the compressor blade through the wakes of the stator blades causes varying aerodynamic forces to act on the compressor blade. The frequency of variation of these forces is f. Vibration of the blade resulting from the varying aerodynamic forces is termed the "forced response". If f matches a natural frequency of a mode of vibration of the compressor blade and if the unsteady aerodynamic forcing matches the associated modeshape, then the compressor blade will resonate. Consequently, the amplitude of vibration of the compressor blade will be relatively large. Such vibrations are detrimental to the compressor blade, and may result in failure of the blade. It is desirable to reduce the detrimental effect of forced response in order to avoid failure of components in the aero engine or turbomachinery of interest.

A possible solution to this problem is to avoid the vane's resonant frequencies by operating at other frequencies. However, this is difficult to implement in practice without altering the performance (i.e. efficiency) of the engine or turbomachinery.

Another possible solution is to decrease the forcing on the vanes, i.e., in the example above, by decreasing the variation in aerodynamic forces seen by the compressor blade. One way to this would be to locate the compressor blades further downstream of the stator blades. However, this increases the axial length of the engine/machinery and thus increases the total weight. This is undesirable.

Another possible solution is to increase the damping available to the vane. However, this is difficult to introduce and control.

The inventors have realised that the above problem may be addressed by altering the vane of interest in order to alter its forced response at a particular frequency. In particular, they have realised that the problem may be addressed during the design stage of the vane.

When designing a vane, it is possible to- determine the local modal force on the vane at a particular frequency of aerodynamic unsteady pressures. The local modal force $MF_L$ provides a measure of the likely forced response of a vane at that local element.

$MF_L$ is the scalar product of two vector quantities, $\Delta F_L$ and $\Delta x_L$. $\Delta F_L$ is the local unsteady aerodynamic force acting on the surface of the local element of the vane. $\Delta x_L$ is the modeshape of the local element of the vane. The modeshape is the actual vibrating shape of a vane at a natural frequency. The modeshape is a physical property of the vane which depends on its geometry and the material which makes it.

SUMMARY OF THE INVENTION

In a general aspect, the present invention provides a modification of a first vane design to give a second vane design, the second design having a reduced correlation between:

(a) a varying force to which the vane is to be subjected, the varying force having a characteristic frequency, and (b) a vibrational mode of the vane, corresponding to the characteristic frequency of the varying force.

In particular, it is preferred to minimise the correlation between (a) and (b). The varying force (a) may be considered to have a shape (sometimes referred to as a "pressure shape"). The vibrational mode (b) may be considered to have a displacement characteristic or modeshape. Preferably the matching between the modeshape and pressure shape is minimised.

In the following, different developments of the invention are introduced. It is to be understood that these developments and/or preferred or optional features thereof, may be combined, and that such combinations are to be considered as hereby disclosed.

First Development

In a first development of the invention, the inventors have devised a design procedure for designing a vane.

In a first preferred aspect of this development, the present invention provides a method of designing a vane using a quantitative characteristic which is a measure of correlation between:

(a) a varying force to which the vane is to be subjected, the varying force having a characteristic frequency, and (b) a vibrational mode of the vane, corresponding to the characteristic frequency of the varying force, the method including the steps of:

(i) determining the quantitative characteristic for a first vane design (ii) determining the quantitative characteristic for a second vane design, the second vane design being a modification of the first vane design, wherein, as a consequence of the modification, the quantitative characteristic of the second design is reduced in comparison to that of the first design.

Preferably, the vibrational mode is characterised by a displacement characteristic. This may be a modeshape of the vane. The quantitative characteristic may be the shape match between (a) and (b).

Preferably, the varying force to which the vane is to be subjected is an unsteady aerodynamic force. Such forces are often complex and usually include more than one frequency component. Usually, the characteristic frequency of the varying force of interest will be the dominant frequency of the force. For example, the dominant frequency may be the frequency component with the highest amplitude. The varying force may include more than one characteristic frequency. In that case, the vibrational mode of the vane may correspond to or be excited by one or more of the characteristic frequencies of the varying force.

Preferably the first and second designs of the vane are numerical or computational models of the vane.

The quantitative characteristic may be representative of a local element of the vane, e.g. a local element of the surface of the vane. As set out below, such local quantitative characteristics may be of use in preparing representative maps of the vane to highlight problem areas of the vane. Alternatively, the quantitative characteristic may be cumulative in the sense of being representative of a larger region of the vane. Such a cumulative characteristic allows a more general indication of the likely response of the vane to specified operational conditions.

The quantitative characteristic preferably is a scalar quantity. It may be determined by calculating the scalar (dot) product of two vector quantities.

The first vector quantity is an indication of the varying force to which the vane is to be subjected. Preferably, this first vector quantity is calculated or estimated. Preferably the first vector quantity is $\Delta F_L$, which is the local unsteady aerodynamic force acting on the surface of a local element of the vane. This may be calculated or estimated using known computational fluid dynamics techniques.

The second vector quantity in the dot product is a displacement characteristic (modeshape) of a vibrational mode of the vane, associated with the vibrational mode corresponding to the characteristic frequency of the varying force. Preferably, the second vector quantity is $\Delta x_L$, which is mentioned above. The modeshape may be determined using known computer-aided engineering (CAE) techniques such as finite element analysis (FEA).

Thus, the quantitative characteristic (the local mode force $MF_L$) for a local element of the vane may be written:

$$MF_L = \Delta F_L \cdot \Delta x_L$$

In practice, the size (e.g. area) of the local element of the vane is determined by the way in which the modeshape $\Delta x_L$ is determined. If this is by finite element analysis, then the meshing arrangement chosen to model the vane usually determines the size of the local element of the vane from which a determination of $MF_L$ can be made.

In one embodiment, local quantitative characteristics may be mapped (e.g. graphically) to give a visual representation of the value of the local quantitative characteristics across the surface of the vane. The visual representations of the first and second designs may then be compared to assess the correlation between factors (a) and (b) for the different designs. This can be a useful tool for looking for localised areas on the vane which are likely to give a high amplitude of forced response under the condition modelled. Thus, a localised area in the first design which has a high forced response can be redesigned (to give the second design) and the same localised area can be analysed in the second design to check the change in the forced response.

The method may further include the step of determining a line-cumulative quantitative characteristic. Preferably, this is done by summing quantitative characteristics determined for local vane elements located along a line. Preferably, the local vane elements are sequential and/or contiguous. For example, the line may follow an aerofoil surface of the vane.

For a vane that extends (or is intended to extend) in a fluid-conveying duct of a turbine engine or turbomachinery, it is possible to define a longitudinal axis of the vane as an axis extending substantially along the vane and substantially radially from the axis of the turbine engine or turbomachinery. The line along which the line-cumulative quantitative characteristic is determined may extend substantially longitudinally along the vane.

Alternatively, the line along which the line-cumulative quantitative characteristic is determined may extend substantially transversely along the vane. Here, the transverse direction is substantially normal to the longitudinal. direction. For example, the line may extend substantially along the chord direction of the vane.

The method may further include the step of determining an area-cumulative quantitative characteristic (or a surface-cumulative qualitative characteristic). This may be done by summing line-cumulative quantitative characteristics, each line-cumulative quantitative characteristic having been determined for local vane elements located along a line, as mentioned above. Each line typically intersects (preferably substantially perpendicularly) an area-summation line. The summation of the line-cumulative quantitative characteristics may be performed along the area summation line. The lines for which the line-cumulative quantitative characteristics are determined preferably lie side-by-side along the area of the vane of interest. The area may be, for example, the whole or a portion of a major face of the vane, e.g. an aerofoil-shaped face of the vane.

Alternatively, the area-cumulative quantitative characteristic may be determined by summing quantitative characteristics determined for local vane elements located on the area of interest of the vane. Preferably, the local vane elements are contiguous. This step may be useful in particular if the area of interest is not a straight-sided or regular shape. Use of this step avoids the need to determine first the line-cumulative data before determining the area-cumulative data.

In terms of the local quantitative characteristic being the local modal force $MF_L$, the line- and area-cumulative quantitative characteristics may be expressed as follows.

$$MFC_{line} = \sum_{i=1}^{i=m} (MF_L)_i$$

where the line along which line-summation is made is line x, along which there are m local elements, and i=1, 2, m−1, m.

$$MFC_{area} = \sum_{j=1}^{j=n} (MFC_{line})_j$$

where the line along which area-summation is made is line z, along which there are n summation lines, and j=1, 2, ..., n−1, n.

Or, alternatively, $$MFC_{area} = \sum_{k=1}^{k=p} (MF_L)_k$$

where there are p local elements in the area of interest and k=1, 2, ..., p−1, p.

Preferably, the area-cumulative (or surface-cumulative) quantitative characteristic is a scalar quantity. In this way, an area-cumulative quantitative characteristic for the first design may be compared in a straightforward manner with an area-cumulative quantitative characteristic for the second design. Similarly, the line-cumulative quantitative characteristic is a scalar quantity. Therefore, the line-cumulative quantitative characteristics for the first design may be compared in a straightforward manner with the line-cumulative quantitative characteristics for the second design. These comparisons can give important information about the likely forced response levels of the vane of the first design, and important information about the likely improvement brought about by the change of design to give the second design.

Preferably, the method is iterative. For example, the method may be repeated once or more than once, using the second design of the first iteration of the method as the first design of the second iteration of the method. For example, 5 or 6 iterations may be performed. In some embodiments, up to 10, 11 or 12 iterations may be performed.

Second Development

The second development of the invention relates to the ways in which the vane design may be altered in order to reduce the correlation between (a) and (b) (e.g. to reduce the matching of the pressure shape and the modeshape) in the first development.

Preferably, in the second development, the method of the first development is incorporated into an optimisation procedure for the design of the vane. The design of the vane may be altered in different ways during the design optimisation procedure. The term "design" of the vane is intended to include not just the geometrical shape of the vane (length, chord width, thickness, etc.) but also, for example, the configuration of the vane with respect to the fluid-conveying duct in which it is to be mounted. For example, the vane design may be modified to change any one (or more) of the lean, sweep or twist of the vane.

The lean of the vane is preferably to be understood as the orientation of the vane in a circumferential direction, i.e. substantially along the circumferential direction of the fluid-conveying duct which is substantially perpendicular to the overall direction fluid movement along the duct. The degree of lean of the vane may change along the longitudinal axis of the vane, e.g. it may increase, decrease or vary in a more complex manner. Note that the longitudinal axis of the vane need not be a straight line. Instead, it may be the mid-chord line of the vane.

The sweep of the vane is preferably to be understood as the orientation of the vane in a direction substantially parallel to the overall direction of fluid movement along the fluid-conveying duct. The sweep of the vane may be in an upstream or downstream direction. The degree of sweep of the vane may change along the longitudinal axis of the vane, e.g. it may increase, decrease or vary in a more complex manner.

The twist of the vane is preferably to be understood as the orientation of the vane about its own longitudinal axis. The degree of twist of the vane may change along the longitudinal axis of the vane, e.g. it may increase, decrease or vary in a more complex manner.

Additionally or alternatively, the design of the blade may be modified by, in the design model, adding or removing material from localised parts of the vane. This may be done by thickening or thinning one or more regions of the vane. Alternatively, it may be done by completely removing a portion of the vane, e.g. one or more corners. Advantageously, the region of the vane modified in this manner may be a region identified as having a high correlation between factors (a) and (b).

Preferably, the modification of the vane design results in an alteration of the position of a nodal line in the modeshape of the vane. In this context, a "nodal line" may be understood as a line of zero or substantially zero deformation in the modeshape.

The nodal lines may be repositioned by modifying at least one of the lean, sweep and twist of the vane design. Additionally or alternatively, the geometry of the vane design and/or the proportions of the vane design may be modified to reposition the nodal lines. Furthermore, the nodal lines may be repositioned by modifying the material of the vane design. These changes (individually or collectively) can result in modification of the stiffness distribution in the vane. Local or global changes in the stiffness have the effect of repositioning the nodal lines of the vane modeshape.

Phase shifts between the modeshape and pressure shape may be introduced by changing the modeshape. Alternatively, a phase shift may be introduced by ensuring that the force reaches the vane at a different time instant. For example, phase shifts may be introduced by leaning or sweeping the vane. Alternatively or additionally, phase shifts may be introduced by changing the spacing between rotor vanes and stator vanes, or by changing the shape of the stator (e.g. overall shape or shape of individual stator vanes).

The optimisation procedure may be iterative. During the optimisation procedure (which may take place by numerical modelling on a computer) the quantitative characteristic of the first design is compared to a threshold quantitative characteristic. The result of that comparison (e.g. "pass" or "fail") may then be used as a basis, in a subsequent step, for modifying the first design to give the second design. Preferably, a corresponding quantitative characteristic is determined for the second design in the same way as for the first design. This corresponding quantitative characteristic may then be compared to (a) the threshold quantitative characteristic and/or (b) the quantitative characteristic of the first design. The result of the comparison (a) (e.g. "pass" or "fail") and/or comparison (b) (e.g. "better" or "worse") may then be used as a basis, in a subsequent step, for modifying the second design to give a third design. Preferably, the process is repeated until the vane design is substantially optimised, i.e. until no substantial improvement (reduction) in quantitative characteristic is seen in a design in comparison to the previous design.

As mentioned above, the second development, and/or any preferred or optional features of the second development, may be combined with the first development, and/or any preferred or optional features of the first development. In addition, further preferred or optional features, which may be incorporated into the first or second developments, are mentioned below.

Preferred or Optional Features, and Further Aspects

Preferably, the vane is a guide vane for a turbine engine (e.g. an aero engine) or turbomachinery. Most preferably, the vane is a blade (particularly a rotor blade) of such an engine or machinery. For example, the blade may be a fan blade, compressor blade or turbine blade.

In the above first aspect, with respect to the first or second development, any of the preferred or optional features of embodiments may be used in any combination. In the following aspects, any of the preferred or optional features of the first aspect may be used. Similarly, any of the preferred or optional features of the following aspects may be combined with each other or with the first aspect.

In a second aspect, the invention provides a vane or vane design obtained or obtainable by the first aspect.

In a third aspect, the invention provides computer code for implementing the method of the first aspect.

In a fourth aspect, the invention provides a programmed computer or linked computers operatively configured to implement the method of the first aspect.

In a fifth aspect, the invention provides a computer programming product (e.g. stored on a data carrier) for implementing the method of the first aspect.

BRIEF DESCRIPTION OF THE DRAWINGS

Embodiments of the invention will now be described, by way of example, with reference to the accompanying drawings, in which.

DETAILED DESCRIPTION OF THE INVENTION

The following embodiments will be described with reference to a blade, in particular to a compressor blade of an aero engine. One such blade is shown schematically in FIGS. 1 and 2.

Figure 1:
FIG. 1 shows a schematic side view of a blade in a non-deformed state.
Figure 2:
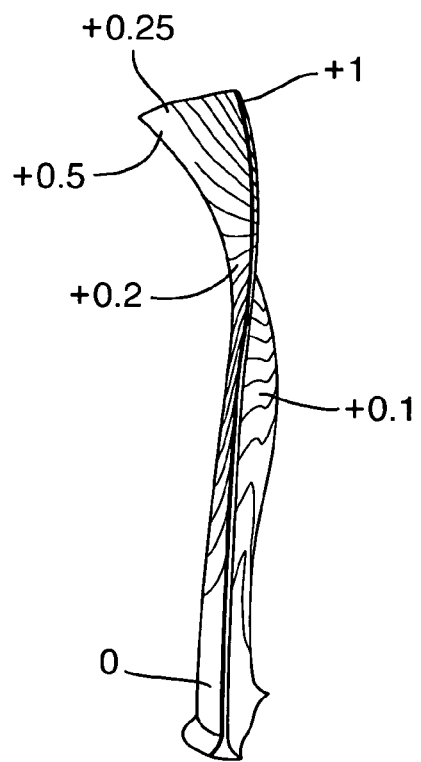
FIG. 2 shows the blade of FIG. 1 in a deformed state.

FIG. 1 shows a drawing of a blade in a non-deformed state. This shape is assumed by this blade when no steady state or vibrational load is applied to the blade. FIG. 2 shows a drawing of the same blade as FIG. 1. However, FIG. 2 shows an instantaneous shape of the blade which is different to that of FIG. 1. In FIG. 2, the blade is deformed due to a vibrational load. A measure of deformation of local elements of the blade is given by the displacement of each local element with respect to the position of the same local element in its non-deformed state. In FIG. 2, the shaded contours indicate lines of equal displacement. The values shown are normalised between 0 and 1. It can be seen that one corner tip of the blade has a significantly higher normalised displacement than the remainder of the blade.

To put the embodiment into practice, it is necessary to set conditions under which the blade must operate. Thus, the overall shape of the fluid-conveying duct (and therefore the general overall shape of the engine) must be known. Also, the exact shape (a first design) of the compressor blade must be known or designed. The shape of the parts of the engine upstream must be known. Usually, the rotor blade will have a set of stator vanes located immediately upstream of it in the duct. The stators are shaped and positioned in order to straighten the flow of gas towards the rotor blades. During operation of the engine, gas moves at high speeds through the duct, past the stators. The rotor blades rotate during engine operation, and so each blade "sees" a series of stator wakes in the gas flow. These stator wakes are the dominant cause of unsteady aerodynamic forces on the surface of the rotor blade.

Note that the stator vanes (which do not rotate) can also see forcing from upstream or downstream rotor blades. The rotor blades can "see" wakes from upstream stator vanes as well as downstream pressure field forcing from downstream stator vanes.

In this preliminary design stage, finite element analyses are carried out (as described below) to determine vibration modes and frequency diagrams for various engine operating conditions (e.g. speeds, gas loads and temperatures).

The unsteady aerodynamic forces ($\Delta F_L$) on the surface of the compressor blade are determined using computational fluid dynamics (CFD). The factors discussed in the above paragraph are taken into account in a computer model of the conditions at the blade surface. $\Delta F_L$ may be determined using known CFD software such as FLUENT, which is available from Fluent, Inc. (10 Cavendish Court, Centerra Park, Lebanon, N.H. 03766, USA) or from Fluent Europe (Sheffield Airport Business Park, Europa Link, Sheffield, S9 1XU, UK). Alternatively, a proprietary Rolls-Royce software such as code AU3D may be used.

For details on the implementation of known modelling techniques, see Sayma, A. I., Vahdati, M., Shardella, L. and Imregun, M., "Modelling of 3D viscous compressible flows using unstructured hybrid grids" AIAA Journal, 38 (b), pp. 945-954.

Alternatively, the unsteady aerodynamic forces acting on the surface of the compressor blade can be measured in a testing engine using strain gauges. The levels of forced response of a given vibration mode measured by strain gauges can be expressed in terms of vibration stresses, amplitude-frequency or percentage endurance (ratio of modal vibration stress to vibration strength of the blade).

Next, it is necessary to determine the modeshape of the blade for a vibration mode that coincides with a particular frequency of forcing. A particularly important frequency in engine blade design is the frequency of forcing which the blade is exposed to at normal operation speeds, for example at cruising speeds.

The excitation or forcing frequency from the upstream blading (i.e. pressure pulses called wakes) or from downstream pressure field forcing may be calculated by multiplying the rotational speed of the rotor by the number of upstream or downstream stator vanes. Note that calculation is done in a similar manner for rotors (rotating parts) relative to stators (non-rotating parts) or vice-versa. For example, for rotor blades that are sandwiched between upstream and downstream stator vanes, the excitation or forcing frequency can be calculated as follows:

$$f_f = \frac{N \times m_{vanes}}{60}$$

where: $f_f$ is the excitation frequency in Hz; N is the rotational speed of the rotor in r.p.m.; and $m_{vanes}$ is the number of upstream or downstream stator vanes.

In the present embodiment, the modeshapes $\Delta x_L$ are needed for the calculation of the map of the modal force.

Modeshapes may be calculated using computer-aided engineering techniques such as finite element analysis (FEA). A suitable FEA software package is NASTRAN, which is available from Noran Engineering, Inc. (5182 Katella Ave., Suite 201, Los Alamitos, Calif. 90720-2855, USA). Other suitable FEA software packages are ANSYS (available from ANSYS Inc.) and ABAQUS (available from ABAQUS, Inc.). Alternatively, a proprietary Rolls-Royce software SC03 may be used.

For details on how such software may be used to determine modeshapes, see Newland, D. E., "Mechanical vibration analysis and computation", Longman Scientific and Technical/Wiley, 1989, ISBN 0-582-02744-b.

For each local element L of the front surface of the blade, the unsteady aerodynamic force vector $\Delta F_L$ and the modeshape $\Delta x_L$ are determined. Then, for each local element L the local modal force $MF_L$ is determined, where $MF_L$ is the scalar product of the two vector quantities $\Delta F_L$ and $\Delta x_L$. The value of $MF_L$ is then mapped to give a graphical representation of the relative values of $MF_L$ across the surface of the blade.

Figure 3:
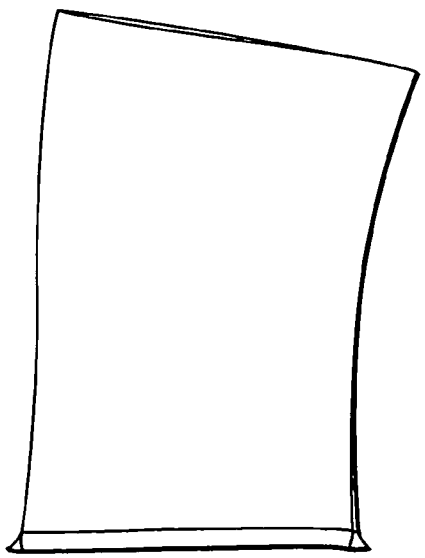
FIG. 3 shows another schematic view (a plan view) of a blade in a non-deformed state.
Figure 4:
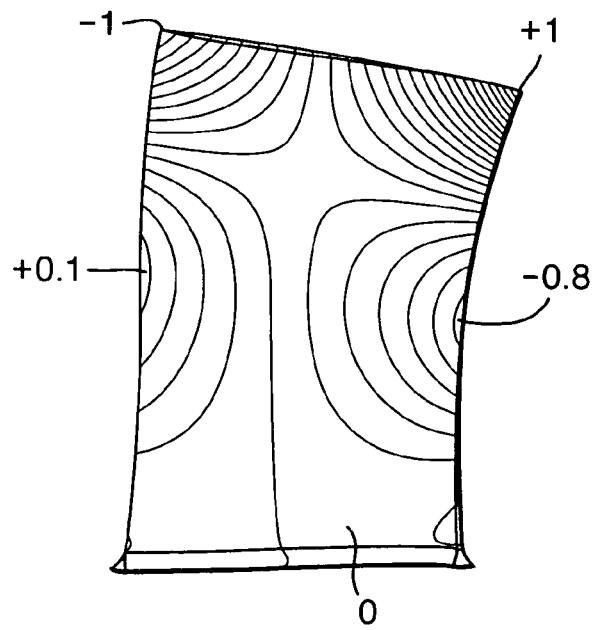
FIG. 4 shows a schematic representation of the modeshape of the blade of FIG. 3, determined in accordance with an embodiment of the invention.

An example of a representation of the modeshape of a blade is shown in FIG. 4, for the blade shown in its non-deformed state in FIG. 3. FIG. 4 shows shaded contours of equal values of $\Delta x_L$. In this particular case, the contours indicate normalised amplitude variations as well as directions of displacements. The vibration mode shown in FIG. 4 is the $2^{nd}$ torsion mode. As shown in FIG. 4, the two upper corners of the blade have the highest amplitude variations, and are displaced in opposite directions from each other.

Figure 5:
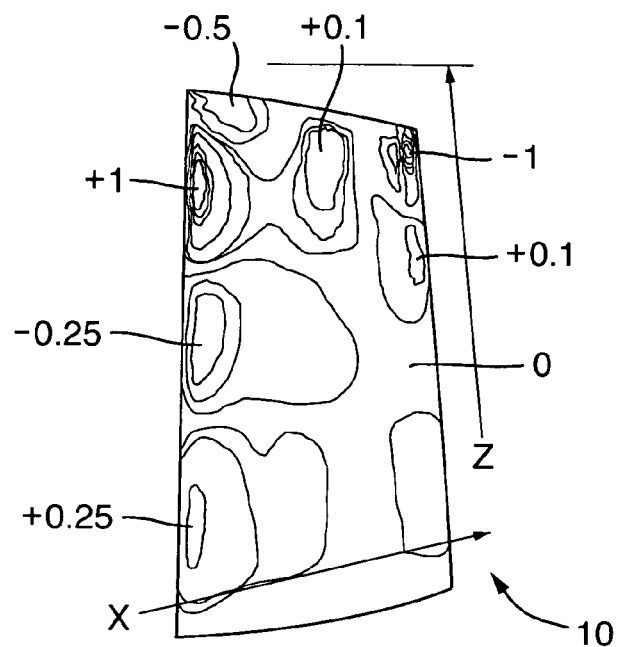
FIG. 5 shows a mapped surface of a blade, the map indicating the variation in magnitude of the local modal force across the surface of the blade, the mapping having been carried out in accordance with an embodiment of the invention.

Another example of a representation of the modeshape of a blade is shown in FIG. 5. Blade surface map 10 in FIG. 5 is a representation of the normalised magnitude of $MF_L$ across the front surface of the blade. Contours of substantially equal normalised $MF_L$ have been drawn as an aid to the eye. Spot values for normalised $MF_L$ are given for selected regions. It can be seen from this drawing that much of the surface of the blade has similar values of $MF_L$. However, a regions near the upper left hand side of the blade (marked "+1") and a region at the upper right hand side of the blade (marked "−1"0 have significantly different values of $MF_L$. $MF_L$ at these regions is significantly higher than for the remainder of the surface of the blade. These regions have high correlation between the local unsteady aerodynamic force and the local modeshape.

As a consequence, these regions are expected to give rise to a high forced response under the conditions modelled. Such regions might give rise to a high cycle fatigue failure of the blade.

FIG. 5 also shows notional lines x and z. These will be discussed in detail later.

Figure 6:
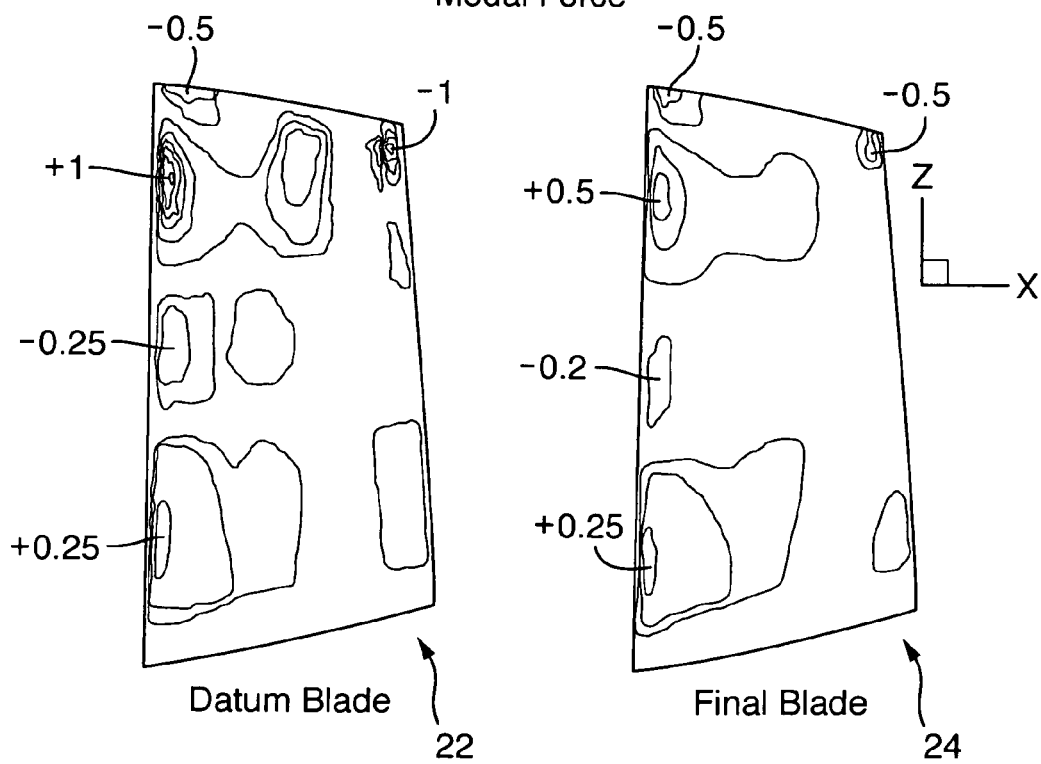
FIG. 6 shows mapped surfaces of two blades of different design, prepared in accordance with an embodiment of the invention.

FIG. 6 shows two blade surface maps 22 and 24. The first map 22 is similar to map 10 in FIG. 5. The blade surface maps in FIG. 6 are representations of the normalised magnitude of $MF_L$ across the front surface of two blades of differing designs. Contours of substantially equal normalised $MF_L$ have been drawn as an aid to the eye. Spot values for normalised $MF_L$ are given for selected regions. Map 22, like map 10 in FIG. 5, shows two regions of high normalised $MF_L$ (marked "+1" and "−1", respectively). These regions are regions of high correlation between the local unsteady aerodynamic force and the local modeshape. The first map 22 is referred to as the "datum", i.e. it is the first design. This first design may be the design of a known blade. The identification of regions of high correlation between the local unsteady aerodynamic force and the local modeshape shows that the blade design needs to be modified in order to reduce $MF_L$ at those regions. The design modification applied to the datum blade design in FIG. 6 was a combination of leaning, sweeping and twisting. A suitable modification has been carried out to the design of blade whose surface values of $MF_L$ are mapped in blade surface map 24. The corresponding regions at the upper left and right hand sides of map 24 have lower normalised values of $MF_L$ (disregarding sign) in comparison to the same regions at the upper left and right hand sides of map 22. Thus, the modification in design of the blade between the datum design (map 22) and the re-design (map 24) leads to a significant reduction in correlation between the local unsteady aerodynamic force and the local modeshape. In practice, this will lead to a smaller forced response of the problem regions identified under substantially the same operating conditions.

Figure 7:
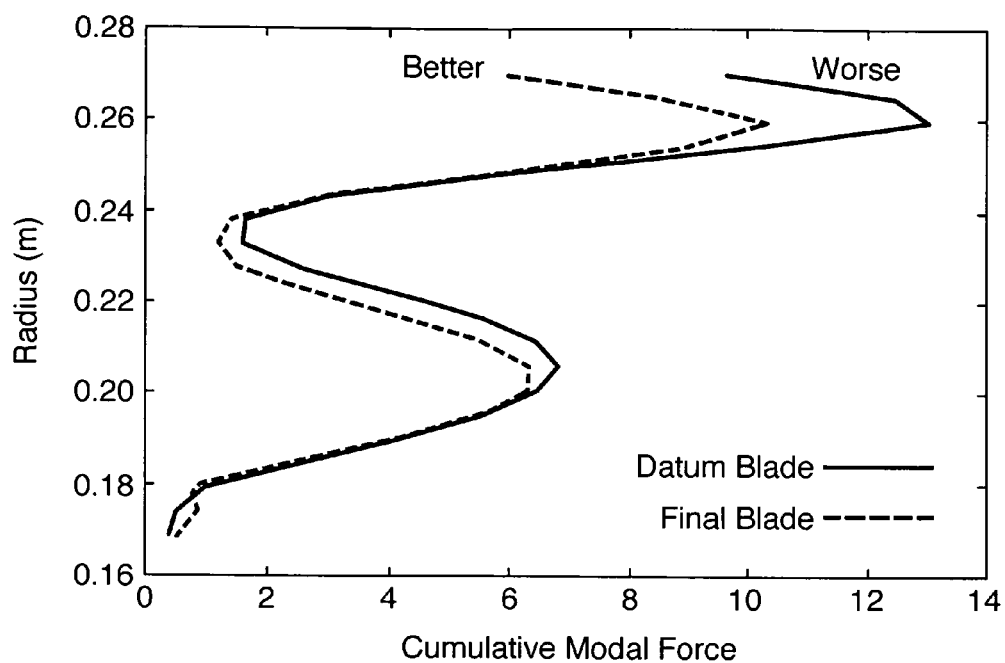
FIG. 7 shows a comparison of the progressive summation of line-cumulative local modal forces to give area-cumulative local modal forces for two blades of different design, in accordance with an embodiment of the invention.
Figure 8:
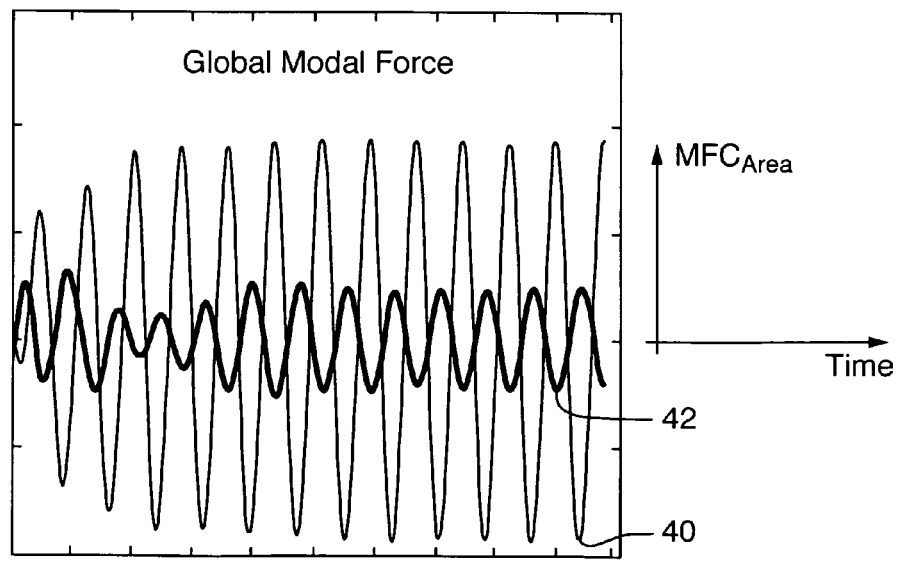
FIG. 8 shows a comparison of global modal force between two blades of different design, in accordance with an embodiment of the invention.

The method illustrated by FIGS. 5 and 6 is useful for identifying and addressing problem areas of the blade. The iterative design and re-design of the blade can reduce the seriousness of problem areas. However, there is also a need to provide a method which gives an indication of the overall (i.e. "global") forced response of the blade. Such a method is an extension of the method illustrated in FIGS. 5 and 6 and is illustrated by FIGS. 7 and 8.

Looking again at FIG. 5, map 10 is a graphical representation of a large number of values $MF_L$ for each local element L of the blade surface. Therefore, it is possible to sum up (i.e. integrate) the values $MF_L$ to give a cumulative mode force value ($MFC_{area}$) for the whole surface (or for just a part of the surface, if desired). This summing may be done either by summing all the elements at once, or by summing $MF_L$ for individual lines or rows of local elements and then summing the line-cumulative mode force value ($MFC_{line}$) for each of those lines or rows.

In FIG. 5, the line summing may first be done along rows of elements parallel to axis x. Axis x is the transverse (or chord) axis of the blade. Thus, for each element i in row j, a line-cumulative mode force value is determined as follows (there being m local elements along the row, and i=1, 2, . . . , m−1, m):

$$MFC_{line} = \sum_{i=1}^{i=m} (MF_L)_i$$

Subsequently, each $MFC_{line}$ may be summed to give the area-cumulative mode force value for the surface of the blade, as follows (there being n summation lines, and j=1, 2, ..., n−1, n):

$$MFC_{area} = \sum_{j=1}^{j=n} (MFC_{line})_j$$

The summation of the lines is done in direction z in FIG. 5, which is the longitudinal (radial) direction of the blade. The progress of the summation is shown graphically in FIG. 7. The abscissa shows the cumulative modal force and the ordinate shows the radius which the summation has reached, which is a measure of how far along the blade in direction z the summation has progressed. The line for the datum blade design is substantially always at higher cumulative modal force than the line for the final blade design. Note that both cumulative values increase and decrease. This is because the local modal forces can be negative as well as positive. Therefore, a region of negative local modal forces after a region of positive local modal forces can reduce the magnitude of the cumulative modal force.

As shown by FIG. 7, the total cumulative modal force (the global modal force) for the final blade design is better (lower) than that of the datum blade design. This final value, which necessarily takes into account all of the blade surface of interest, is a useful measure of the overall likely forced response of the blade design at the operating conditions selected.

In another embodiment of the invention, it is possible to determine the total cumulative modal force (the global modal force) directly from the local modal force values $MF_L$. This may be done by directly summing all of the $MF_L$ values over the blade surface, as follows (where there are p local elements on the blade surface of interest and k=1, 2, ..., p−1, p):

$$MFC_{area} = \sum_{k=1}^{k=p} (MF_L)_k$$

FIG. 8 shows how the global modal force value for two blade designs varies with time. The graph of FIG. 8 was produced using modelled data. Each peak in the graph corresponds to a high global modal force for the whole blade, so corresponds to those times during the movement of the blade where its surface is subjected to high aerodynamic force. Each peak can therefore be tied in with a corresponding stator blade immediately in front of the modelled compressor blade. Line 40 corresponds to the global modal force for a datum blade design. The amplitude of the global modal force is high—this is indicative of a high forced response when a blade of that datum design is subjected to the chosen operating conditions. Line 42 corresponds to the global modal force for a modified (improved) blade design. The amplitude of the global modal force is lower than that of line 40—this is indicative of a lower forced response when a blade of that modified design is subjected to the chosen operating conditions.

The modification of the modeshape can be carried out in such a way that the profile of the source of excitation (i.e. the unsteady pressure profile) and the modeshape are mismatched. Ideally, these shapes are outphased in order to become dissimilar, thereby avoiding resonant response and high amplitudes of vibration for that vibrational mode. A suitable mismatch between the unsteady pressure profile and the modeshape can be created by modifying the positions of nodal lines in the modeshape. Nodal lines are lines of zero deformation in the modeshape. Generally, nodal line repositioning is achieved by changing the shape or orientation of the blade. It does not necessarily require overall stiffening of the blade.

Figure 9:
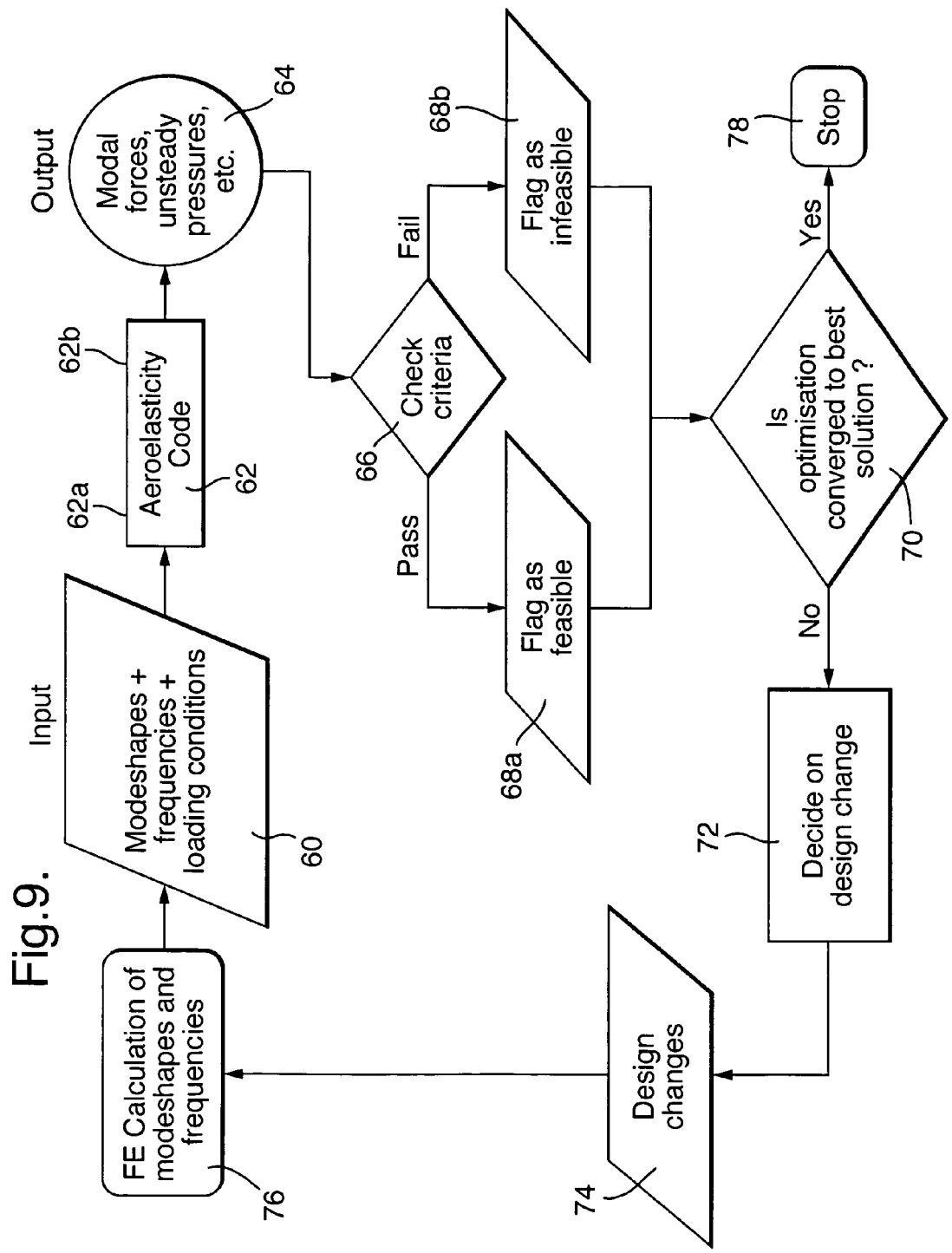
FIG. 9 shows a flow chart illustrating an optimisation procedure according to an embodiment of the invention.

In another embodiment, an optimisation method for vane (blade) design is provided for designing a component to have low levels of vibration forced response. A flow chart for this optimisation is shown in FIG. 9. A blade design is selected as an initial step and its modeshape for at least one frequency is calculated using finite element analysis. At step 60 of FIG. 9, the modeshape, frequency and loading conditions (i.e. speed, gas load and temperature) applied to the blade in the engine are inputted. These are the inputs to step 62 which is an aeroelasticity computer program. This program is in effect a combination of computational fluid dynamics software and finite element analysis software. If desired, these elements of computational step 62 can be separated into sequential steps 62a and 62b. In step 62a, the unsteady aerodynamic forces $\Delta F_L$ acting on the blade surface are calculated (e.g. using FLUENT software). In step 62b, the unsteady aerodynamic forces $\Delta F_L$ are applied (computationally) to the modeshape $\Delta x_L$ of the blade. The result is the mode force $MF_L$ for each element of the finite element model. These results are outputted at step 64. These results include individual values for $MF_L$ and also cumulative values ($MFC_{line}$ and $MFC_{area}$) calculated as described above. These values provide an indication of the likely levels of forced response for a real blade operating in a real engine under the conditions simulated in the model.

For a given mode of vibration for a blade, threshold local modal forces and a threshold cumulative modal force indicate a likelihood that the threshold vibrational strength of the blade will be exceeded, and thus the likelihood that the blade will fail. Therefore, the calculated local modal forces and the calculated cumulative modal forces are compared against the threshold values at step 66. If any threshold value is exceeded, then the design fails and is flagged as infeasible (step 68b). Otherwise, the design passes and is flagged as feasible (step 68a).

The next step 70 requires a determination of whether the optimisation is converged to the best solution. Unless the calculated modal forces are zero, this cannot be determined on a single iteration. Therefore, after step 70, user input is required to see how the design might be changed to address any problems (local or global) in the modal forces outputted at step 64. The change in design can be with the aim of (i) relocating nodal lines in the modeshape to mismatch the modeshape and unsteady pressure shape; (ii) local design change (e.g. local thickening, thinning, reshaping, leaning, twisting or sweeping) to reduce the local modal force; (iii) overall design change (e.g. overall stiffening, thickening, thinning, reshaping, leaning, twisting or sweeping); or a combination of (i), (ii) and (iii). The actual changes to the design are made to the model at step 74.

The changes to the design are aimed at changing the modeshape of the blade. Therefore the modeshape must be recalculated. This is done at step 76. Gross changes to the design may introduce possible frequencies or modes of vibration which were not accounted for previously. Thus, the step 76 must calculate likely modeshapes for the new design of blade under the loading conditions of steps 60 and 62. Once the modeshapes of interest have been calculated, the process is repeated with the new modeshapes replacing the old in step 60. The process is iterated until the design stops improving in terms of the comparison check step 66. At this stage, step 70 can be answered in the affirmative, allowing a stop to the process at step 78.

Once step 78 is reached, the new blade design is optimised in terms of modal force under the conditions modelled. This blade design must be checked using a similar technique but at all the different operating conditions which a blade is likely to meet in service. Also, the blade design must be assessed for non-modal-force side effects which might be detrimental to its performance, e.g. non-vibratory loading and aerodynamic performance (efficiency).

Figure 10:
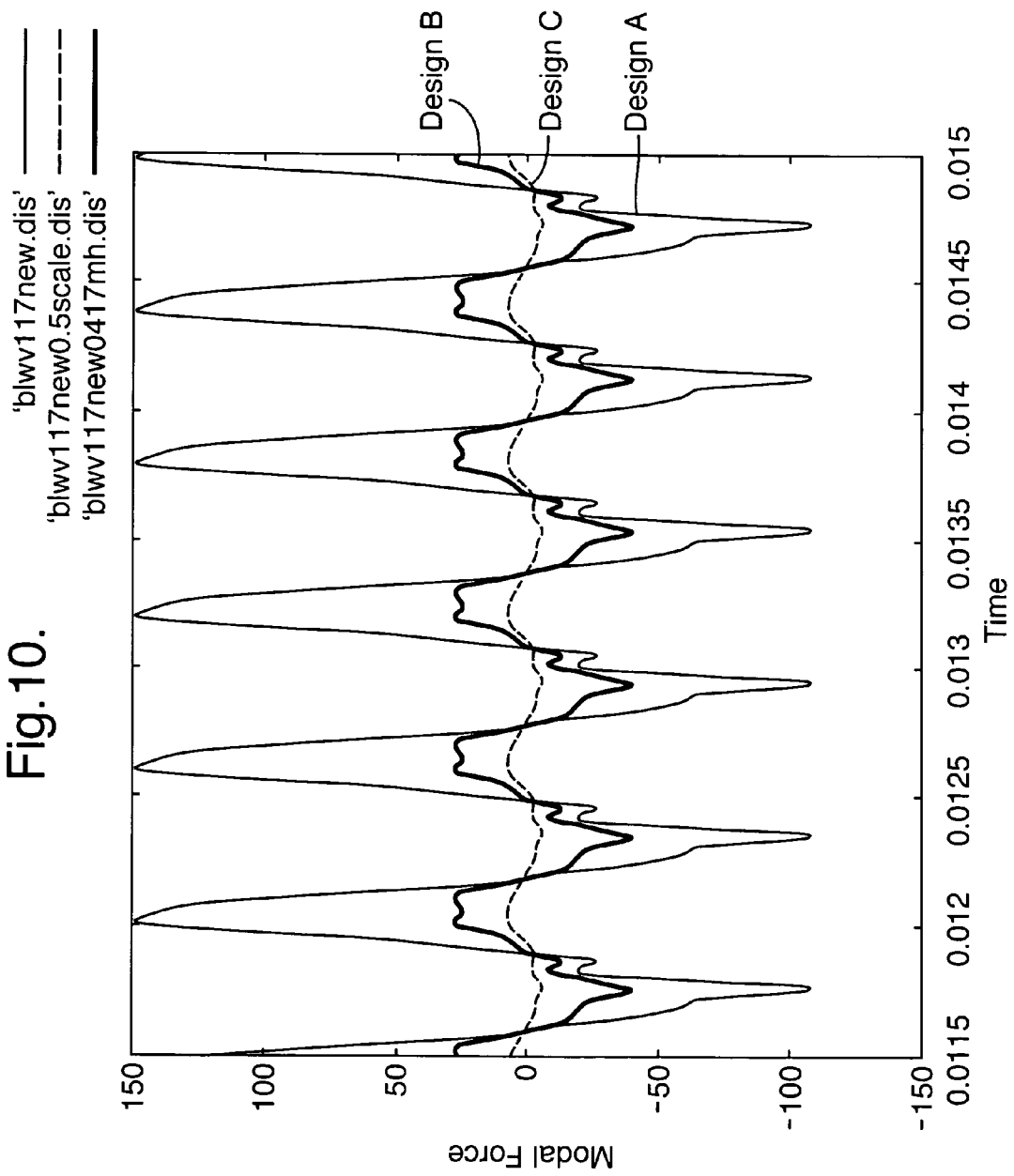
FIG. 10 shows a graph of modal force against time for three blade designs under the same modelled pressure shape conditions, according to an embodiment of the invention.

FIG. 10 shows graphically the results of an embodiment of the invention. In FIG. 10, the abscissa represents time (normalised), and the ordinate represents modal force (normalised). All three of the traces are for blade designs under the same modelled conditions of vibratory loading, i.e. with the same unsteady aerodynamic forces modelled as acting on each blade model surface. The trace for design A has the highest amplitude, i.e. has the highest global (or cumulative) modal force. Design B (the trace with intermediate amplitude) is a modification of design A. The modification results in a lower global modal force. Design C (the trace with the lowest amplitude) is a modification of design B. The modification results in a still lower global modal force. The specific design modifications used to achieve the change in global modal force for designs B and C compared to design A were blade stiffening using local aerofoil leaning and sweeping techniques.

The above embodiments have been described to illustrate and exemplify the invention. On reading this disclosure, modifications of these embodiments, further embodiments and modifications thereof will become apparent to the skilled person and as such are within the scope of this invention.

We claim:

1. A method of designing a vane using a quantitative characteristic which is a measure of correlation between:
   (a) a varying force to which the vane is to be subjected, the varying force having a characteristic frequency, and
   (b) a vibrational mode of the vane, corresponding to the characteristic frequency of the varying force, the method including the steps of:
   (i) determining the quantitative characteristic for a first vane design;
   (ii) determining the quantitative characteristic for a second vane design, the second vane design being a modification of the first vane design such that, as a consequence of the modification, the quantitative characteristic of the second design is reduced in comparison to that of the first design; and
   (iii) providing visual representations of the first vane design and the second vane design.

2. A method according to claim 1 wherein the vibrational mode has a characteristic modeshape.

3. A method according to claim 1 wherein the varying force to which the vane is to be subjected is an unsteady aerodynamic force.

4. A method according to claim 1 wherein the first and second designs of the vane are numerical or computational models of the vane.

5. A method according to claim 1 wherein the quantitative characteristic is a scalar quantity determined by calculating the scalar product of two vector quantities, namely a displacement characteristic and the varying force to which the vane is to be subjected.

6. A method according to claim 1 wherein the quantitative characteristic is representative of a local element of the vane.

7. A method according to claim 6 further including the step of determining a line-cumulative quantitative characteristic by summing quantitative characteristics determined for local vane elements located along a line.

8. A method according to claim 7 wherein the local quantitative characteristic is $MF_L$ and the line-cumulative quantitative characteristic $MFC_{line}$ is expressed as:

$$MFC_{line} = \sum_{i=1}^{i=m} (MF_L)_i$$

wherein the line along which line-summation is made is line x, along which there are m local elements, and i=1, 2, ..., m−1, m.

9. A method according to claim 7 further including the step of determining an area-cumulative quantitative characteristic.

10. A method according to claim 9 wherein the area-cumulative quantitative characteristic is determined by summing line-cumulative quantitative characteristics.

11. A method according to claim 10 wherein the area-cumulative quantitative characteristic $MFC_{area}$ is expressed as:

$$MFC_{area} = \sum_{j=1}^{j=n} (MFC_{line})_j$$

where a line along which area-summation is made is line z, along which there are n summation lines, and j=1, 2, ..., n−1, n.

12. A method according to claim 6 wherein an area-cumulative quantitative characteristic is determined by summing quantitative characteristics determined for local vane elements located on the area of interest of the vane.

13. A method according to claim 12 wherein the area-cumulative quantitative characteristic is $MFC_{area}$ and is expressed as:

$$MFC_{area} = \sum_{k=1}^{k=p} (MF_L)_k$$

where there are p local elements in the area of interest and k=1, 2, ..., p−1, p.

14. A method according to claim 1 wherein the quantitative characteristic is representative of substantially all of one surface of the vane.

15. A method according to claim 1 further including a second iteration after the first iteration of the method, wherein the second design of the first iteration is used as the first design of the second iteration.

16. A method according to claim 1 incorporated into an optimisation procedure for the design of the vane.

17. A method according to claim 1 wherein the vane is a fan blade, compressor blade or turbine blade in an aero-engine or in turbomachinery.

18. A method according to claim 1 including the step of comparing the quantitative characteristic of the first design to a threshold quantitative characteristic to assess the probability of failure of a vane made according to the first design.

19. A method according to claim 18 including the step of comparing the quantitative characteristic of the search design to the threshold quantitative characteristic and/or the quantitative characteristic of the first design in order to assess the improvement of the second design compared to the first design.

20. A method according to claim 18 incorporated into an optimisation procedure for vane design.

21. A vane or vane design obtained or obtainable by the method according to claim 1.

22. Computer code for implementing the method according to claim 1.

23. A programmed computer or linked computers operatively configured to implement the method according to claim 1.

24. A computer programming product for implementing the method according to claim 1.

25. A method of designing a vane using a quantitative characteristic which is a measure of correlation between:
   (a) a varying force to which the vane is to be subjected, the varying force having a characteristic frequency, and
   (b) a vibrational mode of the vane, corresponding to the characteristic frequency of the varying force, the method including the steps of:
   (i) determining the quantitative characteristic for a first vane design
   (ii) determining the quantitative characteristic for a second vane design, the second vane design being a modification of the first vane design, wherein, as a consequence of the modification, the quantitative characteristic of the second design is reduced in comparison to that of the first design wherein the quantitative characteristic is representative of a local element of the vane, said method further including the step of mapping local quantitative characteristics to give a visual representation of the value of the local quantitative characteristics across a surface of the vane for the first design and for the second design.

26. A method of designing a vane using a quantitative characteristic which is a measure of correlation between:
   (a) a varying force to which the vane is to be subjected, the varying force having a characteristic frequency, and
   (b) a vibrational mode of the vane, corresponding to the characteristic frequency of the varying force, the method including the steps of:
   (i) determining the quantitative characteristic for a first vane design
   (ii) determining the quantitative characteristic for a second vane design, the second vane design being a modification of the first vane design, wherein, as a consequence of the modification, the quantitative characteristic of the second design is reduced in comparison to that of the first design wherein the vane design is modified by, in the design model, changing at least one of the lean, sweep or twist of a local part of the vane or of substantially the whole vane.

27. A method of designing a vane using a quantitative characteristic which is a measure of correlation between:
   (a) a varying force to which the vane is to be subjected, the varying force having a characteristic frequency, and
   (b) a vibrational mode of the vane, corresponding to the characteristic frequency of the varying force, the method including the steps of:
   (i) determining the quantitative characteristic for a first vane design
   (ii) determining the quantitative characteristic for a second vane design, the second vane design being a modification of the first vane design, wherein, as a consequence of the modification, the quantitative characteristic of the second design is reduced in comparison to that of the first design wherein the vane design is modified by, in the design model, thickening or thinning one or more localised regions of the vane.

28. A method of designing a vane using a quantitative characteristic which is a measure of correlation between:
   (a) a varying force to which the vane is to be subjected, the varying force having a characteristic frequency, and
   (b) a vibrational mode of the vane, corresponding to the characteristic frequency of the varying force, the method including the steps of:
   (i) determining the quantitative characteristic for a first vane design
   (ii) determining the quantitative characteristic for a second vane design, the second vane design being a modification of the first vane design, wherein, as a consequence of the modification, the quantitative characteristic of the second design is reduced in comparison to that of the first design wherein the modification of the vane design results in an alteration of the position of a nodal line in the modeshape of the vane.

* * * * *